July 14, 1931.  H. J. McGEORGE  1,814,946
MEANS FOR CONVERTING RECTILINEAR MOVEMENT TO ROTARY MOVEMENT
Original Filed Dec. 3, 1929

INVENTOR.
H. J. McGeorge

Patented July 14, 1931

1,814,946

UNITED STATES PATENT OFFICE

HUBERT JOHN McGEORGE, OF TEMUKA, NEW ZEALAND

MEANS FOR CONVERTING RECTILINEAR MOVEMENT TO ROTARY MOVEMENT

Application filed December 3, 1929, Serial No. 411,246. Renewed April 28, 1931.

This invention relates to means for converting reciprocating motion to rotary motion, other than the conventional crank movement.

It has been known for this purpose to mount on the shaft to be rotated, a disc or swash-plate set at an angle to said shaft, the rectilinear movement of the pistons of the prime mover being directed onto the inclined disc or swash-plate near the edge thereof, to cause said disc or swash plate to oscillate and rotate and thus cause the shaft on which it is mounted to rotate.

An objection to this type of device however, lies in the difficulty in obtaining efficient co-action between the edge of the swash-plate and the pistons or connecting rods of the reciprocating mechanism, owing to the combined oscillating and rotating motion of said swash plate.

The object of the present invention is therefore to provide improvements in mechanism of this type whereby the above objection is avoided, and a simple and efficient motion is provided.

The invention will now be particularly described with reference to the accompanying drawings, wherein:—

Figure 1:
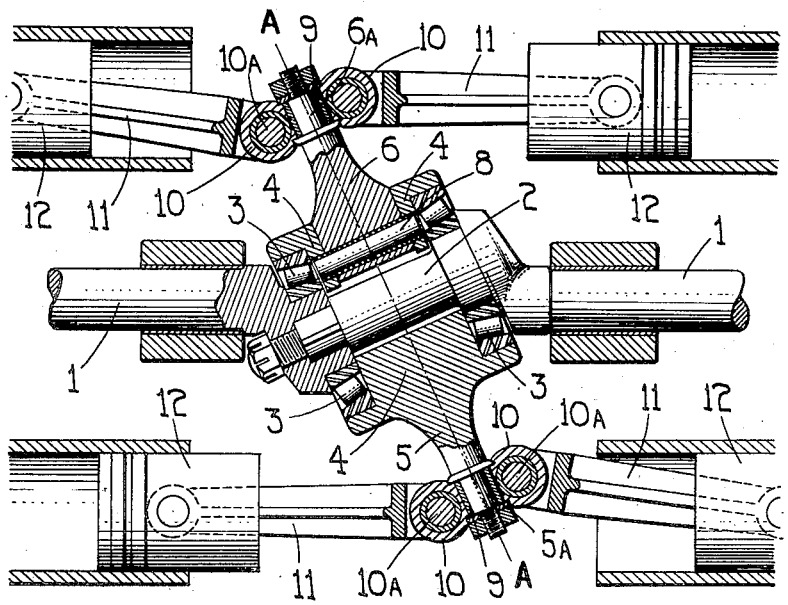
Figure 2:
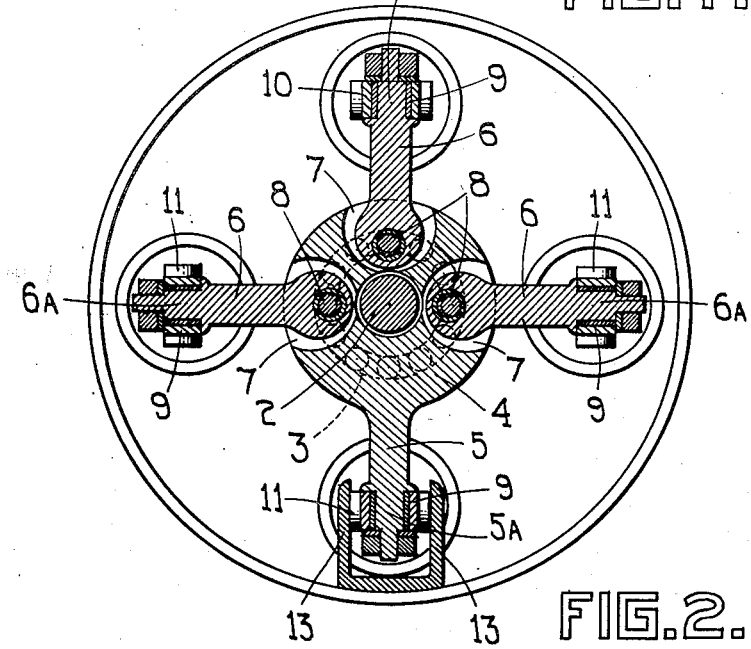

Figure 1 is an elevation, partly in section and partly in diagrammatic form, of the improved movement, and Figure 2 is a cross sectional view thereof, viewed on the line A—A, Figure 1.

There is formed on the shaft 1 to be driven, an angled or inclined crank portion 2 around the ends of which are positioned a pair of radial thrust roller bearings 3.

On and around these bearings 3 is positioned a ring shaped member 4 having extending therefrom radially from the axis of its centre an arm 5 formed integrally with it.

Further similarly shaped arms 6 are positioned at equal distances around the periphery of the ring shaped member 4 and project radially from the latter, but such arms 6 are not formed integral with the ring shaped member 4, but have their inner ends passed in recesses 7 in the latter where they are secured by pins 8 extending parallel to the line of the axis of the ring shaped member 4.

These pins 8 serve as pivots about which the arms 6 are permitted limited turning movement in a plane at right angles to the axial centre line of the member 4, but hold the said arms 6 against any longitudinal movement in relation to the member 4.

The outer ends of the radial arms 5 and 6 are rounded as at 5A and 6A respectively and have passed and secured on said rounded portions, sleeves 9 having formed on opposite sides thereof bosses 10 to which the connecting rods 11 of the reciprocating machine can be pivotally secured by means of pins 10A. This method of connecting the rods 11 to the ends of the arms 5 and 6 permits a limited amount of lateral motion between the said arms and connecting rods, by reason of the fact that the sleeves 9 are turnable on the rounded portions 5A and 6A of the arms 5 and 6.

The other ends of the connecting rods 11 are connected in the usual manner to the pistons 12 of the reciprocating machine, which may be a prime mover of any desired type.

The outer end of the integral arm 5 on the member 4 is positioned in a guide member 13 formed on or secured to a fixed portion of the apparatus, so that while said arm 5 is permitted free reciprocating movement under the action of the pistons 12 in a direction substantially parallel to the shaft 1, said arm 5 is thereby retained against any lateral movement, and the ring shaped member 4 consequently prevented from any tendency to rotate about its axis.

The ring shaped member 4 carrying the arms 5 and 6 and mounted on the roller bearings 3 around the inclined cranked portion 2 of the shaft 1, functions under the action of the pistons 12 and connecting rods 11 in a similar manner to the well known swash plate device, except in that said member 4 does not rotate, but is merely oscillated under the reciprocating action of the connecting rods 11, and by such oscillation causes the cranked portion 2 of the shaft 1 to turn within the bearings 3 and consequently impart rotary motion to the said shaft 1.

Owing to the method of connecting the radial arms 6 to the member 4, they are permitted a certain amount of lateral movement in relation to said member 4, as the latter and said arms 6 are oscillated, while the mounting of the sleeves 9 on the ends of the arms 5 and 6 provides for the taking up of any further play or disproportionate lateral movement between said arms 5 and 6 and the connecting rods 11 pivoted to the said sleeves 9.

The device as above described can also be used for converting rotary movement into rectilinear movement, in which case the prime mover would be operated on the shaft 1 to rotate the latter and impart through the inclined crank 2, member 4 and arms 5, and 6 reciprocatory movement to the connecting rods 11, for the purpose of operating the pistons or buckets of a pump, air compressor or the like.

What I claim as new and desire to secure by Letters Patent is:—

1. Means for converting rectilinear movement to rotary movement comprising the combination of an inclined cranked portion on a shaft to be rotated, roller bearings around the ends of said inclined cranked portion between the latter and a ring shaped member positioned co-axially therewith, an arm formed integrally with said ring shaped member and projecting radially therefrom, and a plurality of equi-distantly spaced radial arms pivotally secured to the ring shaped member so as to be capable of movement about their pivots in the direction of the circumference of said ring shaped member, but not in a direction longitudinally of the latter, means for preventing rotary movement of the ring shaped member and radial arms about the shaft, and means for connecting the reciprocating mechanism to the outer ends of the radial arms.

2. Means for converting rectilinear movement to rotary movement, according to claim 1, wherein the radial arm which is cast integrally with the ring shaped member is received at its outer end in a guide disposed parallel to the shaft to be rotated.

In witness whereof I have signed at Dunedin this 14th day of October, 1929.

HUBERT JOHN McGEORGE.